United States Patent [19]
Akamatsu et al.

[11] Patent Number: 5,642,947
[45] Date of Patent: Jul. 1, 1997

[54] BALLS FOR BALL BEARING

[75] Inventors: Yoshinobu Akamatsu, Kuwana; Kikuo Maeda, Mie; Katsuyoshi Yoshimura, Kuwana; Katsunori Makino, Mie, all of Japan

[73] Assignee: NTN Corporation, Osaka, Japan

[21] Appl. No.: 687,483

[22] PCT Filed: Aug. 14, 1995

[86] PCT No.: PCT/JP95/01620

§ 371 Date: Aug. 6, 1996

§ 102(e) Date: Aug. 6, 1996

[87] PCT Pub. No.: WO96/19678

PCT Pub. Date: Jun. 27, 1996

[30] Foreign Application Priority Data

Dec. 22, 1994 [JP] Japan .................................. 6-319984

[51] Int. Cl.$^6$ ........................................................ F16C 33/32
[52] U.S. Cl. ............................................................... 384/491
[58] Field of Search ........................................ 384/491, 492, 384/625, 565, 494, 516

[56] References Cited

U.S. PATENT DOCUMENTS

| | | | |
|---|---|---|---|
| 4,893,387 | 1/1990 | Akamatsu et al. | 384/491 |
| 4,916,751 | 4/1990 | Sumita et al. | 384/516 |
| 5,064,298 | 11/1991 | Hibi et al. | 384/625 |
| 5,150,974 | 9/1992 | Tamada et al. | 384/492 |

Primary Examiner—Lenard A. Footland
Attorney, Agent, or Firm—Wenderoth, Lind & Ponack

[57] ABSTRACT

The object is to prolong the life of a ball bearing by improving its ability to form oil films. A multitude of needle-like microscopic recesses are formed in a dispersed manner at random in the surface of each ball for a ball bearing. The recesses have a predetermined length and width and are present at a predetermined density so that the surface has a predetermined centerline average roughness.

2 Claims, 2 Drawing Sheets

○ Specimen 1
● Conventional Ball
→ Not Peel Off

BALLS FOR BALL BEARING

TECHNICAL FIELD

This invention relates balls for a ball bearing.

BACKGROUND ART

There is a correlation between damage to the surface of a rolling bearing such as a ball bearing and the oil film parameter ($\Lambda=h/\sigma$), wherein h is the thickness of an oil film at a rolling contact portion, and $\sigma$ is the composite roughness. That is, the smaller the oil film parameter $\Lambda$, the more the rolling elements of the rolling bearing are likely to come into direct contact with each other and the more they are subject to surface damage. The life of the bearing thus shortens.

If the oil film parameter $\Lambda$ is sufficiently large, an oil film is formed between rolling elements and direct contact is prevented, so that the rolling bearing will enjoy a long life.

Some conventional rolling bearings have the surfaces of their rolling elements mirror-finished by machining to minimize any surface damage and thus to prolong their lives.

Other conventional rolling bearings have microscopic recesses in the form of pits in their surfaces to increase the thickness of oil films formed between the rolling elements. For the same purpose, it is also known to form discontinuous grooves extending in a direction substantially perpendicular to the rolling direction of each rolling element.

An increasingly large number of today's rolling bearings are used in a low-viscosity oil or at high temperatures in order to minimize the energy loss due to friction between machine parts equipped with the rolling bearings and thus improve the machine's performance.

The lower the viscosity of the lubricating oil and/or the higher the operating temperature, the thinner the oil film thickness h tends to be, and the more the rolling elements are likely to come into direct contact with each other. Under operating conditions where the oil film parameter $\Lambda$ is less than one, rolling elements will be in direct contact with each other at all times.

Lubricating conditions where rolling elements are brought into direct contact with each other are generally called "boundary lubrication" or "mixed lubrication".

Today's rolling bearings have surfaces with such little roughness that these surfaces can be practically called mirror-finished surfaces. It is impossible to prolong the life of such bearings used under boundary lubricating conditions by the conventional method in which the oil film parameter $\Lambda$ is increased by adjusting the surface roughness to prevent direct contact between rolling elements.

It became apparent from recent studies that there is a possibility that oil films may be formed in microscopic areas on a contact surface under boundary lubricating conditions if the contact surface has microscopic protrusions or recesses. Formation of oil films in such microscopic areas is called "micro-EHL effect".

One conventional ball bearing is formed with pits in its rolling surfaces to achieve the micro-EHL effect. This ball bearing has however a problem in that, due to a large depth of the pits, the acoustic value tends to be high as compared with a bearing having finished surfaces with no pits.

Although it is possible to reduce the depth of such pits by barreling, and thus reduce the acoustic value, such barreling will reduce the number of pits, thus reducing the thickness of the oil films. That is, such barreling impairs the otherwise excellent oil forming ability of the pits.

The method of forming discontinuous grooves perpendicular to the rolling direction of a rolling element is applicable only if the rolling element is of a type whose rolling direction never changes, such as rollers of roller bearings. This method is not effective for rolling elements whose rolling direction is not fixed but varies, such as balls of a ball bearing.

An object of the present invention is to provide rolling elements for a ball bearing which can avoid direct contact between the rolling elements even if the bearing is used under boundary lubricating conditions.

According to the present invention, there is provided a ball for a ball bearing having a surface formed with a multitude of microscopic needle-shaped recesses extending in random directions and present in a dispersed manner. The recesses measure 2.0–30 μm in length and 0.3–2.0 μm in width. Per 100-square-micrometer area of the surface, one to fifteen (1–15) recesses are present. The centerline average roughness of the ball should be from 0.005 μm to 0.012 μm.

SUMMARY OF THE INVENTION

The recesses assist in the formation of oil films on minute parts of the contact area between rolling elements, thus preventing metal-to-metal contact under boundary lubricating conditions. It is thus possible to prolong the life of the ball bearing.

DETAILED DESCRIPTION OF THE PREFERRED EMBODIMENT

Embodiments of the present invention are described with reference to the accompanying drawings.

Figure 1:
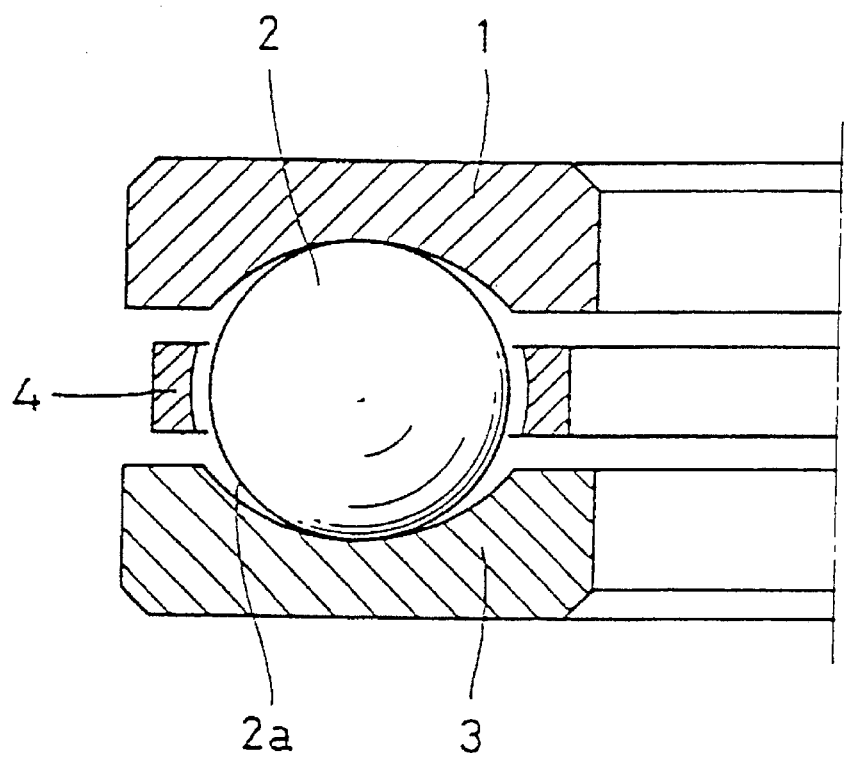
FIG. 1 is a partial sectional view of a rolling bearing.

FIG. 1 shows a sectional view of a thrust ball bearing. It comprises a rotary ring 1, a fixed ring 3, a plurality of balls 2 retained between the rotary ring 1 and the fixed ring 3, and a cage 4 retaining the balls 2 to space them circumferentially at equal intervals.

Figure 2:
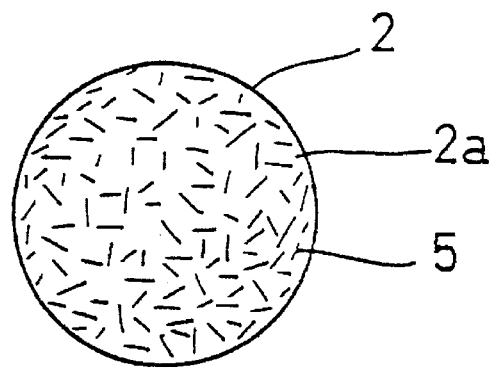
FIG. 2 is an enlarged front view of a ball; according to the present invention.

As shown schematically in FIG. 2, a multitude of needle-shaped recesses 5 are formed in a dispersed manner in the surface of each ball 2 so as to extend in random directions.

Besides the balls for thrust ball bearings as shown above, the present invention is also applicable to balls for such ball bearings as deep groove ball bearings and angular ball bearings.

Experiment 1

A life test was conducted using the balls of the thrust ball bearing shown in FIG. 1. This thrust ball bearing measures 30 mm in inner diameter and 47 mm in outer diameter. Its balls have a diameter of 6.35 mm. The balls prepared for the test are conventional balls, balls according to the present invention and balls as comparative examples.

The balls according to the present invention were ground with a grinding wheel having a small grain size, i.e. a grain size of #2000–#6000 to form a multitude of microscopic needle-shaped recesses extending in random directions.

In order to form needle-shaped recesses, the grinding pressure and other grinding conditions were adjusted so as to reduce the contact area between the grinding wheel and each ball.

Table 1 shows, for each of five kinds of balls 1–5 according to the present invention and Comparative Examples 1–3, the centerline average roughness Ra, the length and width of each recess, the number of recesses, and the 10% life ratio to the conventional balls. "10% life" represents the period of time until the cumulative failure probability reaches 10%.

The experiment was conducted by rotating the bearing at 1000 rpm while dip-feed lubricating the bearing with 30 cc of low-viscosity lubricating oil having a dynamic viscosity of 1.5 mm$^2$/at 40° C. so that the rotary ring 1 is completely submerged in the lubricating oil. The maximum contact surface pressure was set at 4.4 GPa to accelerate rolling fatigue. The temperature was 60° C.

Figure 3:
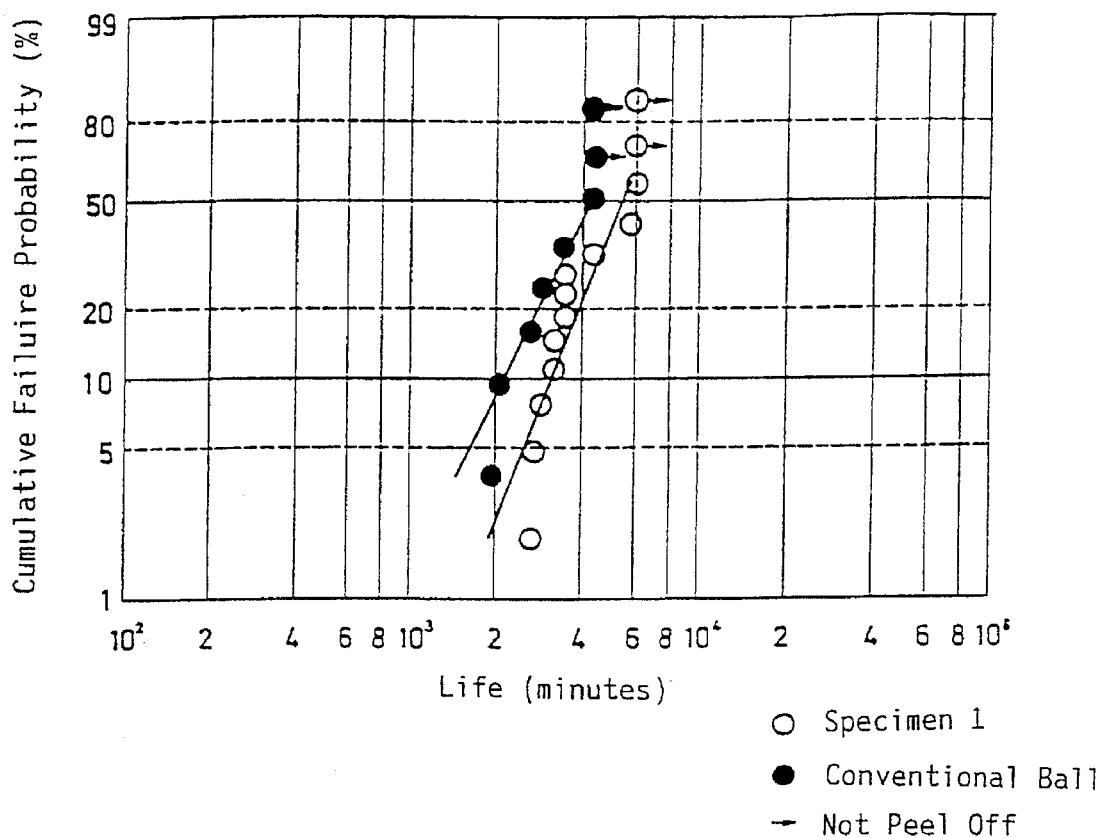
FIG. 3 is a Weibull; distribution graph showing the results of a rolling fatigue life comparison test.

FIG. 3 shows the Weibull distribution curve for the ball specimen 1 according to the present invention. This figure clearly shows that the ball according to the present invention is longer in both 10% life and 50% life than the conventional balls.

For Comparative Example 1, formation of oil films was insufficient because the surface roughness was large. Thus, its life was short.

Comparative Example 2 showed a longer life than Comparative Example 1 because the former was smaller in surface roughness. But its life was shorter than the balls according to the present invention because its recesses were wide and long and thus the formation of oil films was insufficient.

Comparative Example 3 was also short-lived because its recesses were rather long and wide, though the surface roughness was small compared with Comparative Example 2.

These results show that the bearing life is not improved if the surface roughness is larger than the thickness of oil films formed due to the micro-EHL effect achieved by microscopic scratches formed in the surface of the ball.

To form sufficiently thick oil films, it is necessary that not only the surface roughness but the length and width of the recesses be sufficiently small. This is because the larger the number of areas where micro-EHL effect is achieved, the more effectively it is possible to form oil films over the entire contact surface.

Since recesses formed in the balls according to the present invention are sufficiently shallow, the bearing having these balls was as low in acoustic value as a bearing including conventional balls having conventional finished surfaces with no recesses.

Experiment 2

In order to determine the oil film forming ability of the balls according to the present invention, the metallic contact rate of the ball 1 according to the present invention was calculated by measuring the electric resistance of the oil films formed on the ball 1 under the boundary lubricating conditions.

The experiment was conducted by rotating the rotary ring 1 of the bearing under a predetermined load while dip-feed lubricating the bearing with 30 cc of low-viscosity lubricating oil having a dynamic viscosity of 1.5 mm$^2$/s at 40° C. so that the rotary ring 1 is completely submerged in the lubricating oil. The maximum contact surface pressure was set at 2.9 GPa. The temperature was at room temperature.

The rotary ring 1 was accelerated linearly from zero to 1600 rpm in 5 minutes. Condition of oil films formed between the balls 2 and the bearing rings was determined by a DC electric resistance method.

Specifically, the electric resistance was measured between a mercury slip ring mounted to the end of a spindle used to drive the rotary ring 1 and a housing in which the fixed ring 3 is mounted.

The electric resistance thus measured will be zero if the balls 2 are in direct contact with both the rotary ring 1 and the fixed ring 3, and will be infinite if the balls 2 are separated from one or both of the rotary ring 1 and the fixed ring 3 by oil films.

Figure 4:
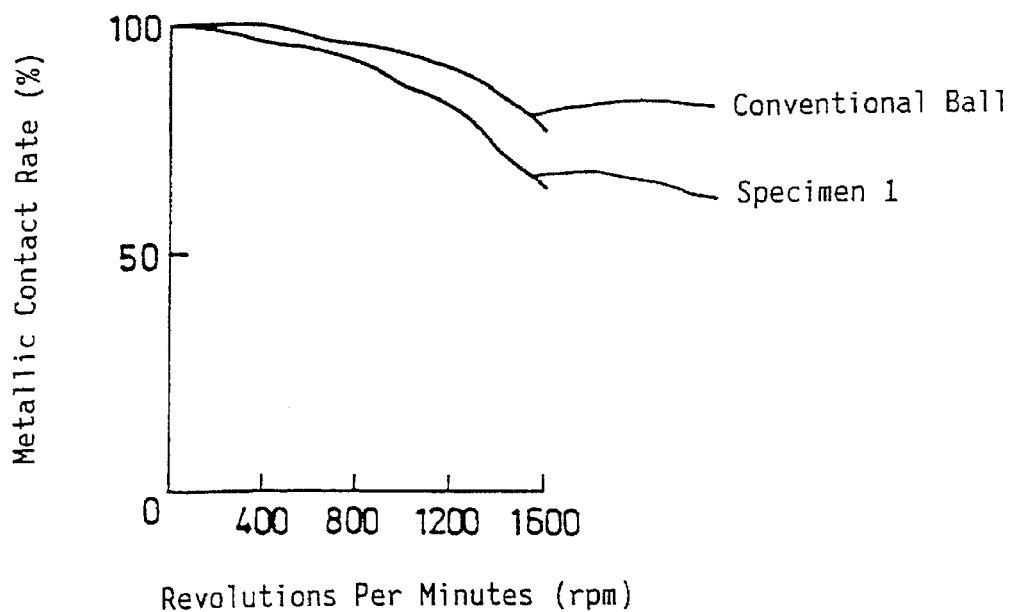
FIG. 4 is a graph showing the results of an oil film forming ability comparison test.

FIG. 4 shows the liquid metallic contact rate as calculated from the electric resistance of the ball 1 according to the present invention as compared with that of the conventional balls. The metallic contact rate is given by the formula:

$$\text{Metallic contact rate (\%)} = 100 \times T1/(T1 + T2)$$

where T1 is the time during which the electric resistance was zero, and T2 is the time during which the electric resistance was infinite.

From FIG. 4, one can see that Experiment 2 was conducted under the boundary lubricating conditions where the rolling elements are brought into direct contact with each other. Also, it is apparent from FIG. 4 that the ball according to the present invention has a greater ability to form oil films under the boundary lubricating conditions than conventional rolling elements. Such a high oil film forming ability is attributable to the micro-EHL effect achieved by the needle-like microscopic scratches formed in the surface of the ball.

Industrial Application

According to this invention, it is possible to improve the oil film forming ability of a ball bearing used under boundary lubricating conditions and thus to prolong its life.

TABLE 1

Result of experiment

| Type of ball | Centerline average roughness Ra (in μm) | Length of recess (in μm) | Width of recess (in μm) | Number of recess (per 100 μm$^2$) | Ratio of 10% life |
|---|---|---|---|---|---|
| Conventional ball Example | 0.003–0.005 | — | — | — | 1 |
| 1 | 0.005–0.007 | 5–20 | 0.5–2 | 5–15 | 1.5 |
| 2 | 0.010–0.012 | 2–15 | 0.3–1.5 | 3–10 | 2.1 |
| 3 | 0.005–0.008 | 3–30 | 0.3–1.5 | 1–8 | 2.2 |
| 4 | 0.006–0.008 | 4–25 | 0.4–1.5 | 3–10 | 1.6 |
| 5 | 0.008–0.011 | 2–30 | 0.3–2 | 2–8 | 1.7 |
| Comparative Example | | | | | |
| 1 | 0.040–0.045 | 10–30 | 2–4 | 1–5 | 0.7 |
| 2 | 0.030–0.035 | 30–40 | 2–3 | 1–5 | 1.0 |
| 3 | 0.010–0.015 | 20–40 | 2–3.5 | 2–12 | 1.1 |

We claim:

1. A ball for a ball bearing having a surface formed with a multitude of microscopic needle-shaped recesses extending in random directions and present in a dispersed manner, said ball having a centerline average roughness of 0.005 μm to 0.012 μm.

2. A ball for a ball bearing as claimed in claim 1 wherein said recesses measure 2.0–30 μm in length and 0.3–2.0 μm in width and wherein 1–15 of said recesses are present per 100-square-micrometer area of said surface of said ball.

* * * * *